United States Patent
Adrangi et al.

(10) Patent No.: US 9,521,552 B2
(45) Date of Patent: Dec. 13, 2016

(54) METHOD AND APPARATUS TO USE SMART PHONES TO SECURELY AND CONVENIENTLY MONITOR INTEL PCS REMOTELY

(75) Inventors: Farid Adrangi, Lake Oswego, OR (US); Victor B. Lortz, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 160 days.

(21) Appl. No.: 13/977,569

(22) PCT Filed: Dec. 27, 2011

(86) PCT No.: PCT/US2011/067371
§ 371 (c)(1),
(2), (4) Date: Jun. 28, 2013

(87) PCT Pub. No.: WO2013/100899
PCT Pub. Date: Jul. 4, 2013

(65) Prior Publication Data
US 2014/0045464 A1 Feb. 13, 2014

(51) Int. Cl.
*H04M 1/66* (2006.01)
*H04W 12/12* (2009.01)
(Continued)

(52) U.S. Cl.
CPC .............. *H04W 12/12* (2013.01); *H04L 63/20* (2013.01); *H04W 4/14* (2013.01); *H04W 4/008* (2013.01); *H04W 4/02* (2013.01)

(58) Field of Classification Search
CPC ...... H04W 12/00; H04W 12/02; H04W 12/04; H04W 12/06; H04W 12/08; H04W 12/10; H04W 12/12; H04W 4/008; H04W 4/14; H04M 1/7253; H04M 1/72533; H04M 3/00
(Continued)

(56) References Cited

U.S. PATENT DOCUMENTS 7,463,861 B2 * 12/2008 Eisenbach ..................... 455/41.2
8,045,961 B2 * 10/2011 Ayed et al. ...................... 455/411
(Continued)

FOREIGN PATENT DOCUMENTS

WO 2013/100899 A1 7/2013

OTHER PUBLICATIONS

International Search Report and Written Opinion Received for PCT Patent Application No. PCT/US2011/067371, mailed on Sep. 14, 2012, 10 pages.
(Continued)

*Primary Examiner* — Huy C Ho
(74) *Attorney, Agent, or Firm* — Forefront IP Lawgroup, PLLC

(57) ABSTRACT

Techniques for monitoring information technology (IT) assets using mobile devices are described herein. The mobile device is configured to wirelessly communicate with the IT asset using a near field communications (NFC) standard used to communicate over short distances. The IT asset is configured to include a monitoring device that is operable in a low power mode as well as in a normal power mode to monitor security related parameters. An alarm is generated in response to detecting a breach in security of the IT asset and the mobile device is notified of the alarm. A user may use the mobile device to send an encrypted message to the IT asset and instruct it to operate in a lockout mode, thereby protecting the digital assets accessible via the IT asset from unauthorized use.

12 Claims, 5 Drawing Sheets

(51) Int. Cl.
    *H04L 29/06*     (2006.01)
    *H04W 4/14*     (2009.01)
    *H04M 3/00*     (2006.01)
    *H04W 4/00*     (2009.01)
    *H04W 4/02*     (2009.01)

(58) Field of Classification Search
    USPC .......................................................... 455/410
    See application file for complete search history.

(56) References Cited

U.S. PATENT DOCUMENTS

| | | |
|---|---|---|
| 2009/0203349 A1* | 8/2009 | Hollstien .................. 455/404.1 |
| 2010/0022217 A1 | 1/2010 | Ketari |
| 2010/0283600 A1 | 11/2010 | Herbert et al. |
| 2011/0141276 A1* | 6/2011 | Borghei ........................ 348/143 |

OTHER PUBLICATIONS

International Preliminary Report on Patentability and Written Opinion received for PCT Patent Application No. PCT/US2011/067371, mailed on Jul. 10, 2014, 7 pages.

\* cited by examiner

METHOD AND APPARATUS TO USE SMART PHONES TO SECURELY AND CONVENIENTLY MONITOR INTEL PCS REMOTELY

BACKGROUND

Due to the ease of use, improved battery power management, and access to information via instant communications, the use of portable mobile computing devices that are often classified as information technology (IT) assets has skyrocketed in recent years. Examples of mobile computing devices may include notebooks, laptops, pads and tablets, smart cellular phones and similar others. Often these mobile computing devices store or provide access to personal or corporate digital assets such as confidential personal data, proprietary technical information, or classified documents. There is a growing security concern about potential theft or misplacement of such mobile computing devices.

Techniques to improve security often rely on the use of strong passwords or the use of cable lock dongles to protect the digital assets. However, many of these techniques may be easily bypassed or disabled to steal valuable information.

BRIEF DESCRIPTION OF THE DRAWINGS

The Detailed Description references the accompanying figures. In the figures, the left-most digit(s) of a reference number identifies the figure in which the reference number first appears. The same numbers are used throughout the drawings to reference like features and components.

DETAILED DESCRIPTION

Figure 1:
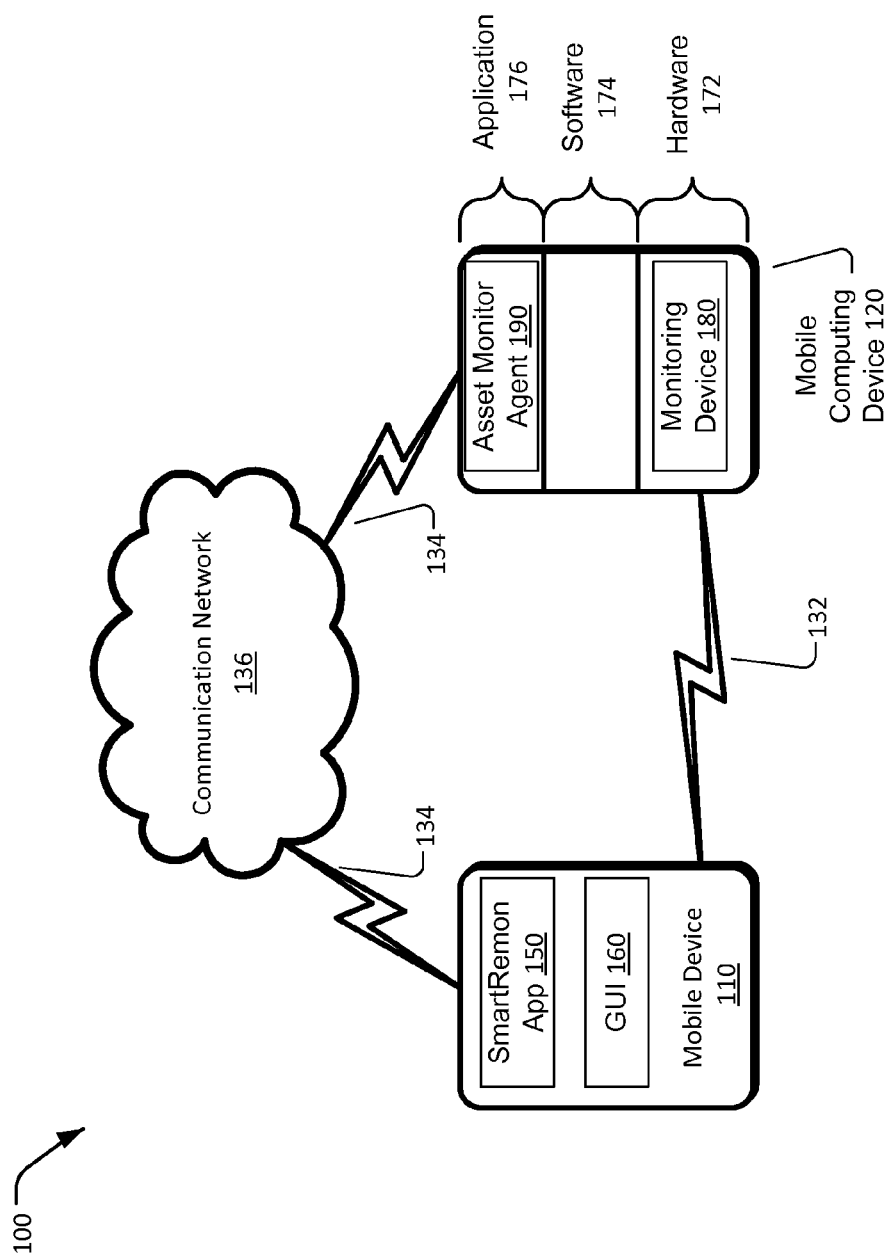
FIG. 1 illustrates a block diagram of a remote monitoring system configured to monitor information technology (IT) assets.

Applicants recognize that software-only solutions to monitor IT assets such as computer systems typically require: 1) the support of an operating system (OS) that is loaded and is operational, and 2) normal power mode of operation. Therefore, the software-only solutions may not be effective when the above conditions are not met, e.g., when the computer system is operating in a low power or sleep mode.

Applicants also recognize that hardware-type solutions such as cable lock dongles equipped with an alarm typically require the user to locate a non-movable anchor object to secure the IT asset. Therefore, the hardware-type solutions may not be effective when an anchor object is not readily locatable.

The security of an IT asset may be improved by incorporating a monitoring device that is integrated into the hardware or firmware of the IT asset. The monitoring device is configured to operate in all modes of power operation of the IT asset. This includes all power modes that consume lower power than the normal power mode. Examples of low power operating modes may include sleep mode, standby power mode, hibernate mode, deep sleep mode, and similar others. Therefore, the operation of the monitoring device is independent of the availability of the OS and is independent of the power mode of operation of the IT asset.

The IT asset may be remotely monitored by using a mobile device such as a smart cellular phone. The IT asset and the mobile device may be paired by simply tapping the two devices using a near field communications (NFC) standard. The tapping procedure may be used during initial set up for authentication of identities, and for enabling or disabling of an alarm feature of the monitoring device.

The monitor device may be configured to generate the alarm in response to detecting a breach of security. Events that define a breach of security for the IT asset may be configured to include detecting motion, detecting a loss of communication using the NFC standard, receiving a user input and similar others. The IT asset may send a notification alarm to the mobile device in response to detecting the breach of security using a secure short message service (SMS) text message or message payload. The task of generating the alarm and the task of notification of the alarm may be performed by the monitor device independent of whether the IT asset is operating in a low power mode or in a normal power mode.

In response to receiving the notification alarm, an authorized user may send an authenticated SMS text message to the IT asset to perform an action such as request a current location of the IT asset, place it in a lockout mode to limit unauthorized access, or similar other. Authentication may used to prevent an attacker from sending a malicious message that the recipient interprets as genuine. It is desirable to prevent an attacker from sending malicious messages to the mobile device.

The IT asset includes an interactive display device for generating displays on a display screen and an input device to receive user inputs. A graphical user interface (GUI) display is configured to manage user interaction related tasks. The GUI may be used to configure various functions of an Asset Manager (AM) agent used to define various policies, rules and conditions for performing alarming and remote monitoring functions. For example, the AM may define that the IT asset simply inform the mobile user about its current location in response to an alarm condition or in some applications the AM may define that the IT asset be placed in a lockout mode in response to the alarm.

The mobile device may include a monitor application to remotely monitor the IT asset (simply referred to as a SmartRemon App). The SmartRemon App is similar to an App program developed for an Apple or Android or Windows cellular phone that may be purchased from an Internet App Store web site, may be provided as a utility by the IT asset manufacturer, or may be pre-loaded into the mobile device by the phone manufacturer.

The mobile device is configurable to perform wireless communications for: 1) contacting other mobile phone users, accessing Internet based services, and communicating via SMS text messages with the IT asset, and 2) communicating with the IT asset that is located within a close proximity using the NFC standard. The SmartRemon App uses the same intuitive, graphical user interface (GUI)

display available on a mobile device to manage user interaction related tasks. The GUI improves the user experience of remotely monitoring the security of IT assets. Examples of some of the functions provided by the SmartRemon App may include displaying location of the IT asset on a map display and sending an authenticated SMS text message to the IT asset to perform an action.

This brief introduction, including section titles and corresponding summaries, is provided for the reader's convenience and is not intended to limit the scope of the claims, nor the proceeding sections.

The word "example" is used herein to mean serving as an example, instance, or illustration. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Remote Monitoring System to Monitor IT Assets

FIG. 1 illustrates a block diagram of a remote monitoring system 100 configured to monitor portable IT assets such as notebooks, laptops, pads and tablets, smart cellular phones and similar others. In addition to the portable computer system hardware, IT assets may also include infrastructure software, application software, databases, knowledge bases, proprietary technical information, classified documents, and similar other digital assets. The remote monitoring system 100 includes a mobile device (may also be referred to as a smart phone) 110 that is configured to remotely monitor an IT asset implemented in the form of a mobile computing device (MCD) 120 using at least two separate wireless communication standards. It is understood that, unless otherwise stated, any communication network or device described herein may be implemented as a wired or wireless network or device.

In some implementations, a message (or a message payload) may be sent over another network transport such as an internet protocol (IP) network, which may be 3G, 4G, WiFi, and similar others. As long as a first processor (not shown) of the MCD 120 is coupled to a communications interface that is active and connected to a publicly routable network in a low power mode, the monitoring device 180 may send a secure message to the mobile device 110.

The mobile device 110 is configurable to wirelessly communicate with: 1) the MCD 120 using an interface 132 for short distance communications, and 2) web sites via the Internet and with other wireless cellar phone users using interface 134 for communications via a communication network 136. The interface 132 includes two components, one component, which is included in the mobile device 110, and another component which is included in the MCD 120. The interface 132 may utilize a communications standard such as a near field communications (NFC) standard or a Bluetooth standard that may be suitable for short distance communications.

The interface 134 may be based on IEEE 802.11 and/or 802.16 family of standards for wireless communications over longer distances. Additional details of the flow of communications between the mobile device 110 and the MCD 120 via interfaces 132 and 134, including initial setup and operation, are described with reference to FIG. 4.

Although not expressly shown in FIG. 1, the mobile device 110 and MCD 120 are both computing devices (or computer systems) that may include hardware, firmware, and/or software, which are configured to perform, at least in part, the techniques described herein. In addition, it is understood that the remote monitoring system 100 may include additional number of mobile devices and/or mobile computing devices to fit the asset monitoring requirements.

An architecture for the MCD 120 may typically include hardware 172, software 174, and application 176 layers. Included in the hardware 172 layer is a monitoring device 180 that may be configured to monitor security related events. Examples of security related events may include monitoring operation of the communications interfaces 132 and 134, detecting motion of the MCD 120, and detecting tampering of the MCD 120 by an unauthorized user. Additional details of the monitoring device 180 configured to perform various remote monitoring related operations are described with reference to FIGS. 2 and 4.

The software 174 layer may include components such as an operating system (OS), drivers, application programming interfaces (API's) and similar others. The application 176 layer may include software programs that leverage the functionality of the software 174 layer to perform one or more functions such as processing documents, spreadsheets, and similar others. For performing alarming and remote monitoring functions, an Asset Manager (AM) agent 190 may be configured in the application 176 layer to define various policies, rules and conditions. The policies, rules and conditions may be configured by the user using a graphical user interface (GUI) of the MCD 120 or via a GUI 160 of the mobile device 110. Additional details of the configuration of the AM agent 190 are described with reference to FIGS. 3 and 4.

To conserve power, the MCD 120 is operable in several power usage modes such as normal power mode during periods of normal computing activity and a low power mode during periods of significantly reduced computing activity, e.g., during periods of sleep, hibernation, or inactivity. Transition between the different power usage modes may be automatic, event triggered, or activated by a user.

Although the MCD 120 may operate in a low power mode to reduce power consumption, the monitoring device 180 is configured to be active and is enabled to be fully operational in a continuous mode to monitor security related events. Thus, the operation of the monitoring device 180 is independent of whether the MCD 120 is operating in at least one of a normal power mode and a low power mode.

In response to detecting a security threat, the monitoring device 180 is configured to generate an alarm and notify the mobile device 110 by sending a secure SMS text message via the interface 134 and the communication network 136. In response to receiving the alarm, a user of the mobile device 110 may send an authenticated message to the monitoring device 180 (and hence MCD 120) to perform one or more actions. Examples include identifying the current location of the MCD 120 on a map displayed by the mobile device 110, logging out and shutting down the MCD 120, securing the hard disk, or placing the MCD 120 in a lockout mode to prevent unauthorized user access. The remote monitoring system 100 is configured to support cryptographic features with hardware-protected key storage suitable for enterprise-class data protection.

The monitoring device 180 may be configured to generate audible warning sounds in response to detecting the security threat and dissuade potential attackers from continuing with an attack. In addition to activating an alarm, the monitoring device 180 may also collect audio and/or video data from sensors on the platform to generate additional forensic evidence available for later investigation. The forensic information collected may be sent over an IP network or over a suitable 3G or 4G network using technology such as multimedia messaging service (MMS). As an option, the remote monitoring system 100 may provide an optional cloud service for enterprise-class monitoring and asset protection.

The mobile device 110 includes a SmartRemon App 150, a software program, which may be configured to improve the user experience of remotely monitoring the security of IT assets. The SmartRemon App 150 leverages the intuitive and easy-to-use graphical user interface (GUI) 160 of the mobile device 110 for user interaction. The SmartRemon App 150 customizes the GUI 160 for monitoring the security of IT assets. Additional details of the GUI 160 to perform various remote monitoring related operations are described with reference to FIGS. 3 and 4. Flow of communications between the mobile device 110 and the MCD 120 via interfaces 132 and 134, including initial setup and operation, are described with reference to FIG. 4.

A Mobile Computing Device with a Monitoring Device

Figure 2:
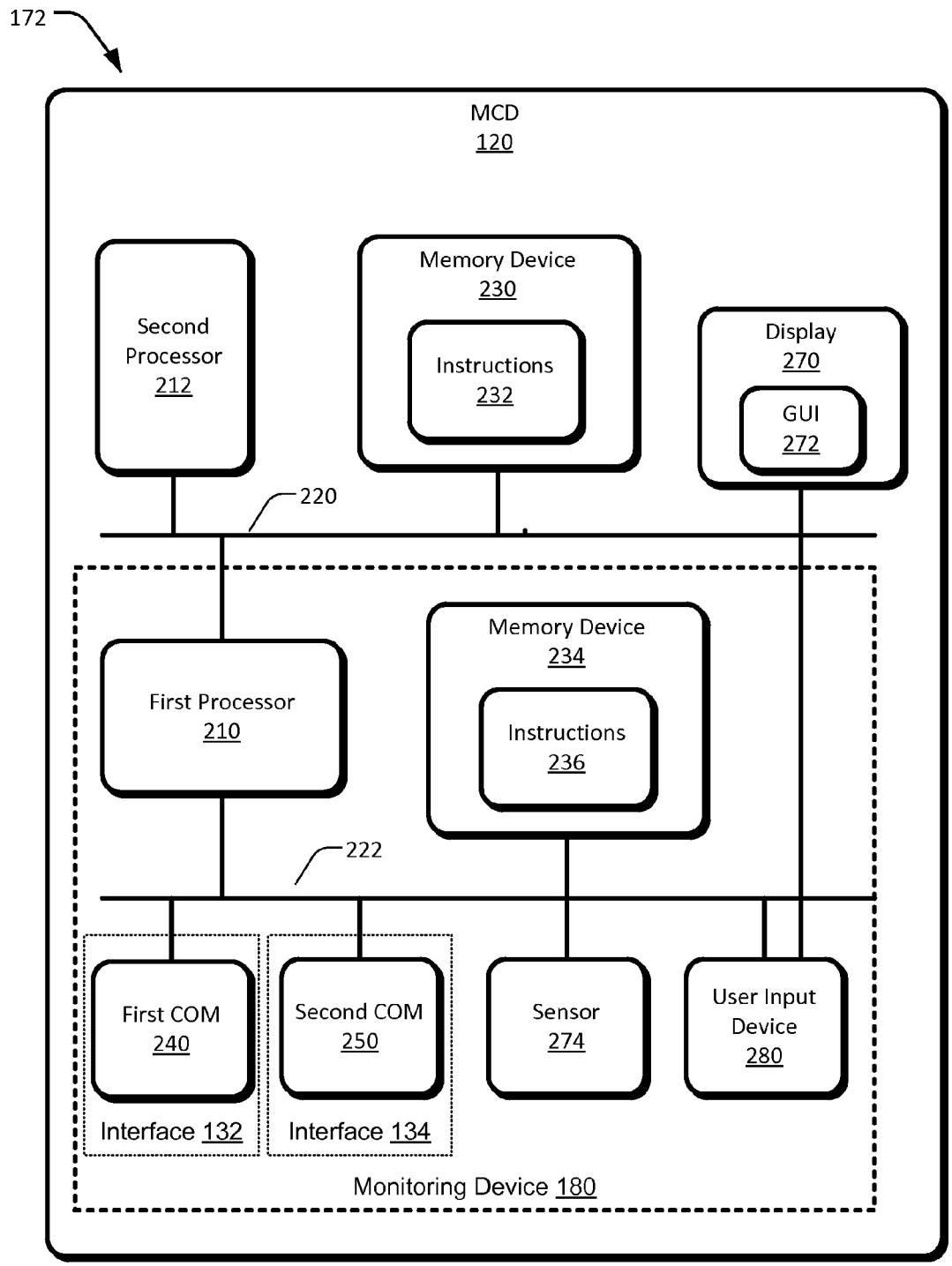
FIG. 2 is a block diagram illustrating additional details of a mobile computing device (MCD) described with reference to FIG. 1. The illustrated portions implement tools and techniques to remotely monitor digital assets described herein.

FIG. 2 is a block diagram illustrating additional details of a mobile computing device (MCD) 120 described with reference to FIG. 1. The mobile computing device 120 and the mobile device 110 are both computing devices that may be configured to have substantially the same computer system components (e.g., hardware, firmware, software, or any combination thereof) except for types of peripheral devices and loading/performance specifications for the components.

The hardware 172 of the MCD 120 includes a second processor 212 coupled to a bus 220, a memory device 230 coupled to the second processor 212 via the bus 220, a display device 270 coupled to the second processor 212 via the bus 220, a user input device 280 coupled to the second processor 212 via the bus 220, and a monitoring device 180 coupled to the second processor via the bus 220. The display 270 is configured to provide a GUI 272 for user interaction. Although not shown, the input device 280 may include a QWERTY type fixed keypad for user input. The memory device 230 may be used to store the digital assets.

In one application, a level of activity of the second processor 212 may be used to determine whether or not the MCD 120 is operating in a low power mode or a normal power mode. When operating in a low power mode the second processor 212 is configured to receive an interrupt signal but is not configured to execute instructions stored in the memory device 230. Also, when the MCD 120 is operating in a low power mode, operation of the OS is typically suspended.

The monitoring device 180 includes a first processor 210, a first communications module (COM) 240 coupled to the first processor 210 via a bus 222, a second COM 250 coupled to the first processor 210 via the bus 222, a sensor 274 coupled to the first processor 210 via the bus 222, and the user input device 280 coupled to the first processor 210 via the bus 222. A memory device 234 storing instructions 236 may be coupled to the first processor 212 via the bus 222. As an option, the memory device 234 may be integrated into the first processor 210.

In one application the first processor 210 is configured to receive interrupts and execute instructions 236 independent of whether the MCD 120 (and hence the second processor 212) is operating in a low power mode or a normal power mode. Since the monitoring device 180 may be implemented as hardware or firmware, it is independent of the availability of the OS.

In one application, the first processor 210 may be directly coupled (e.g., bus 222 may be optional) to the memory device 234, first communications module (COM) 240, second COM 250, the sensor 274, and the user input device 280. The sensor 274 is configurable to sense one or more variables such as motion, GPS position, temperature, and similar others. The user input device 280 is configured to detect receiving a user input.

The first COM 240, may be configured to wirelessly communicate over very short distances, e.g., within a close proximity of about 20 centimeters, using the interface 132 and the first communication standard described with reference to FIG. 1. As previously described, the first communication standard may include a near field communications (NFC) standard configured to provide secure authenticated communications between any two NFC compliant devices. The first communication standard may also include the Bluetooth standard.

Near Field Communication (NFC) is a very short-range wireless standard that enables secure authenticated wireless communication between NFC compliant devices over a short distance of approximately 2-4 centimeters. NFC is an ISO based standard. The ISO 14443 Type A and Type B standards+FeliCa is a four-part international standard for contact-less smart cards operating at 13.56 MHz in close proximity with a reader antenna. The ISO 18092 standard defines communication modes for NFC Interface and Protocol.

The NFC standard enables data transactions, data exchange, and wireless communications between two NFC compliant devices in close proximity to each other, e.g., located approximately within 20 centimeters. The NFC standard compliant devices may be configured to automatically discover one another. The mobile device 110 may be configured to query the mobile computing device 120 and establish the wireless link. Set up time for automatically pairing two NFC compliant devices is typically less than 1 millisecond. Compared to the NFC standard, the Bluetooth standard typically supports communication over longer distances (e.g., up to 30 meters) and requires a longer set up time (e.g., about 5-6 seconds).

The second COM 250 may be used to communicate with other computing devices via the interface 134 the communication network 136 and a second communication standard. The second communication standard may be based on IEEE 802.11 family of standards for wireless local area network (WLAN). The mobile device 110 may also be configured to support IEEE 802.16 family of standards for wireless broadband devices such as 2G, 3G or 4G cell phones with long term evolution (LTE) or WiMAX capability.

The memory device 234 is operable to store instructions 236 that are executable by the first processor 210 to perform one or more functions in a manner that is independent of whether the MCD 120 is operating in a low power or a normal power mode. The first processor 210 is operable to execute instructions or commands 236 received from the user of the wireless device 110 to perform communication functions and to perform actions to protect digital assets that may be stored in or may be accessed via the MCD 120. An action performed by the first processor 210 in response to detecting a breach of security may include disabling the second processor 212 to be awakened from the low power mode to the normal power mode.

Events that define a breach of security for the MCD 120 may be configured to detect a loss of communication and generate a separation alarm, detect motion of the MCD 120 and generate a motion alarm, and detect receiving a user input and generate a tamper alarm similar others. In response to the generation of the separation alarm, or the motion alarm, or the tamper alarm, the monitoring device 180 may generate a security alarm (or simply an alarm) and send the alarm to the mobile device 110.

The components of the mobile computing device 120 may be modules of computer-executable instructions, which are instructions executable on a computer, computing device, or the processors of such devices. While shown here as modules, the components may be embodied as hardware, firmware, software, or any combination thereof. The techniques described herein may be performed, as a whole or in part, by hardware, software, firmware, or some combination thereof.

Mobile Device with Dual Communications and SmartRemon App

Figure 3:
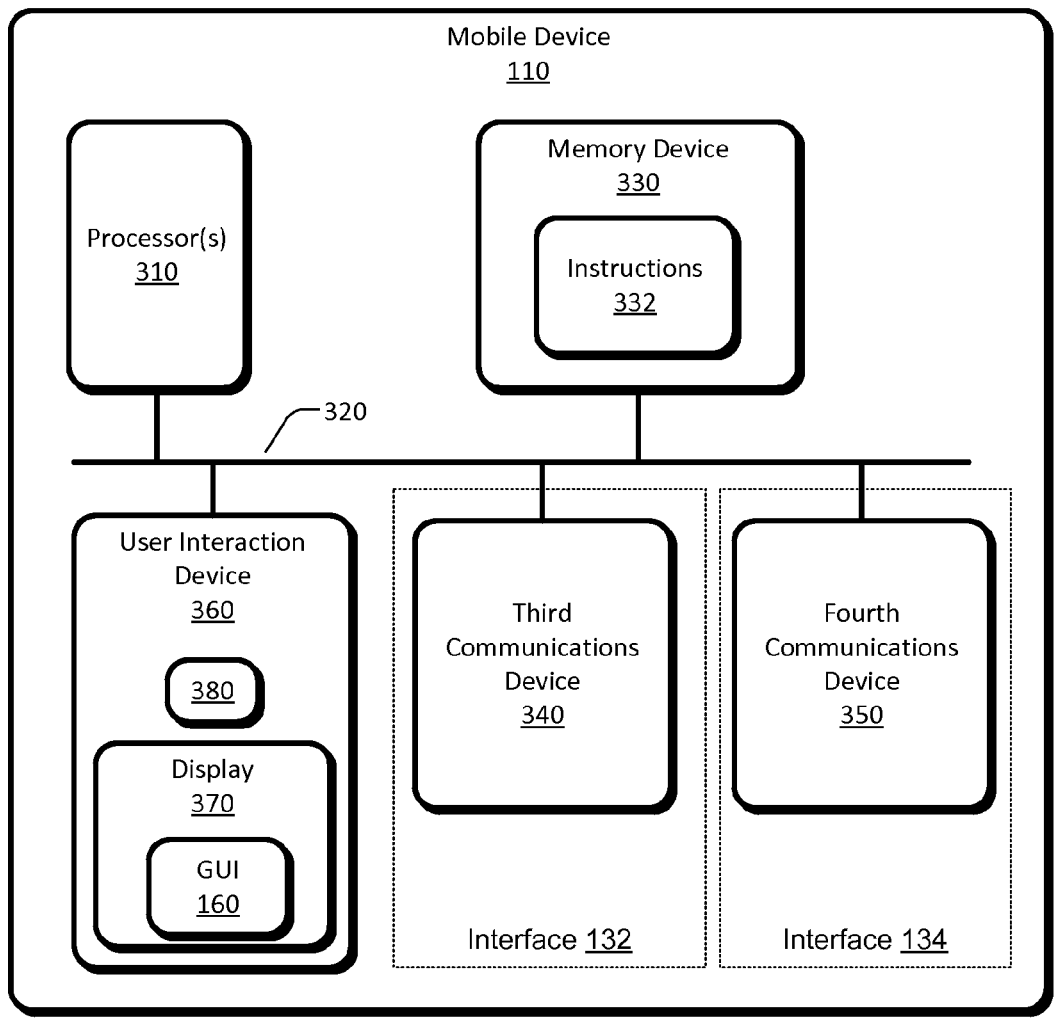
FIG. 3 is a block diagram illustrating additional details of a mobile device described with reference to FIG. 1. The illustrated portions implement tools and techniques to remotely monitor digital assets described herein.

FIG. 3 is a block diagram illustrating additional details of a mobile device described with reference to FIG. 1. The mobile device 110, which is a type of a computing device or a computer system, includes a processor 310 coupled to a bus 320, a memory device 330 coupled to the processor via the bus 320, a third communications device 340 coupled to the processor 310 via the bus 320, a fourth communications device 350 coupled to the processor 310 via the bus 320, and a user interaction device 360 coupled to the processor 310 via the bus 320.

The user interaction device 360 may include a display 370 and an input device 380 such as a touch screen, a mouse, a trackball, or similar other cursor positioning peripheral configured to receive user input. The display 370 is configured to provide the GUI 160 for user interaction. In one application, the GUI 160 and GUI 272 may be configured to have a substantially similar look and feel. Although not shown, the input device 380 may include a smaller sized QWERTY type fixed keypad for user input. In some applications, the display 370 and the input device 380 may be configured as separate components that may be directly coupled to the bus 320.

It should be understood that depending on the computing load more than one processor may be included in the mobile device 110. The memory device 330 is operable to store instructions or commands 332 that are executable by the processor 310 to perform one or more functions. It should also be understood that the term "computer system" is intended to encompass any device having a processor that is capable of executing program instructions from a memory medium. Various functions, processes, method 500, programs, and operations described herein may be implemented using the mobile device 110. For example, the processor 310 is operable to execute the instructions 332 associated with the SmartRemon App 150 for remotely monitoring and securely communicating with the MCD 120.

The components of the mobile device 110 may be modules of computer-executable instructions, which are instructions executable on a computer, computing device, or the processors of such devices. While shown here as modules, the components may be embodied as hardware, firmware, software, or any combination thereof. The techniques described herein may be performed, as a whole or in part, by hardware, software, firmware, or some combination thereof.

The third COM 340, which forms one of the two components of the interface 132, is configured to wirelessly communicate over short distances using a first communication standard. The first communication standard may include a near field communications (NFC) standard configured to provide secure authenticated communications between any two NFC compliant devices located in very close proximity or a Bluetooth standard.

The fourth COM 350 is configurable to wirelessly communicate with the communication network(s) 136 using a second communication standard. The second communication standard may be based on IEEE 802.11 family of standards for wireless local area network (WLAN). The mobile device 110 may also be configured to support IEEE 802.16 family of standards for wireless broadband devices such as 2G, 3G or 4G cell phones with LTE or WiMAX capability.

The mobile device 110 is configured to communicate with the monitoring device 180 included in the MCD 120 independent of whether the MCD 120 is operating in a low power mode or in a normal power mode. The SmartRemon App 150 using the GUI 160 may be used to perform one or more remote monitoring functions such as initial set up and configuration of the remote monitoring system 100, verification of the authenticity of an alarm notification SMS text message sent by the monitoring device 180, preparing a response to the alarm notification that is in accordance to the various policies, rules and conditions configured in the Asset Manager (AM) agent 190 during the initial set up, and cryptographically communicating a SMS text message to instruct the MCD 120 to perform an action, e.g., a lockout of the device.

Flow of Communications Between an IT Asset and a Mobile Device

Figure 4:
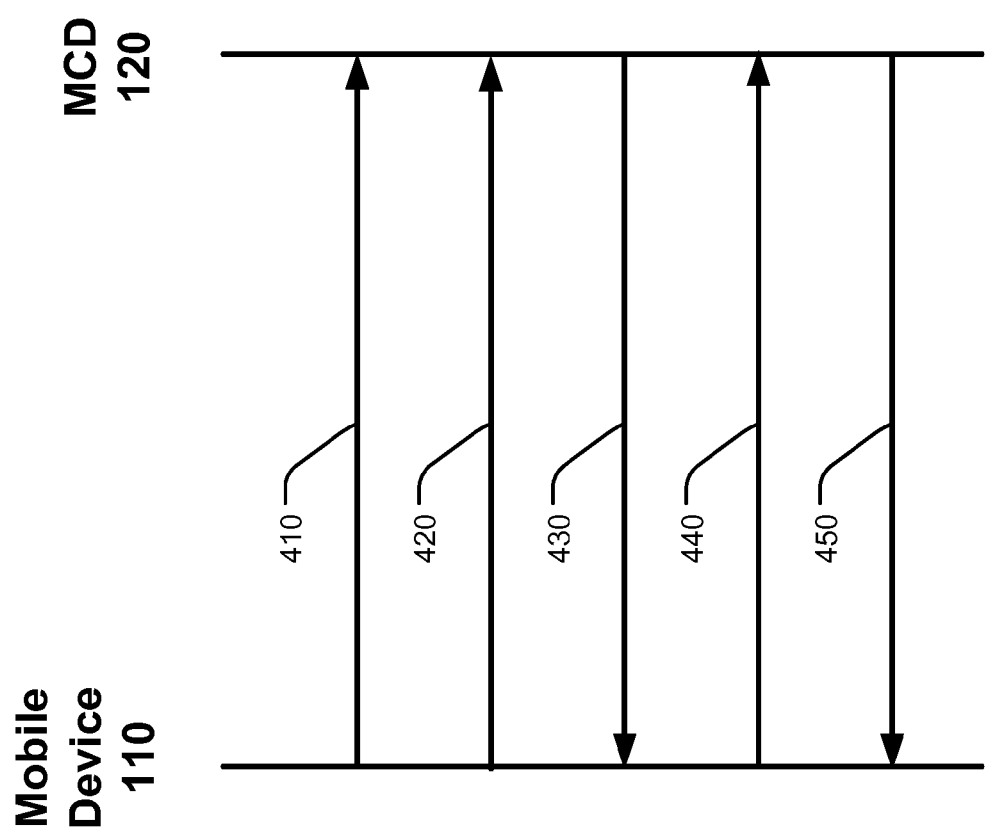
FIG. 4 is diagram illustrating a flow of communications between a mobile device and a MCD described with reference to FIGS. 1, 2 and 3.

FIG. 4 is diagram illustrating a flow of communications between the mobile device 110 and the MCD 120 via interfaces 132 and 134 described with reference to FIGS. 1, 2 and 3. To simplify the communications flow diagram, responses to a request initiated by a device are not shown. At process 410, an initial set up and configuration of the remote monitoring system 100 is performed by pairing of the mobile device 110 and the MCD 120 based on a communication standard such as the NFC communicating via the interface 132. The mobile device 110 is configured to initiate the pairing process.

The pairing process establishes and authenticates the identities of both the devices. The pairing process may be expedited by using the NFC tap operation, which may include simply tapping the mobile device 110 and the MCD 120 devices. The NFC data exchange may verify that the SmartRemon App 150 is properly licensed and certified by a trusted publisher.

Once trust between the mobile device 110 and the MCD 120 is established, the two devices may exchange cryptographic keys used to authenticate and protect future communications. The cryptographic keys may be accessed from a library of cryptographic keys implemented as hardware-protected keys for providing improved enterprise-class data protection.

The initial set up may also include configuration of the Asset Manager (AM) agent 190, which may include definition of various policies, rules and conditions that constitute a breach in security. For example, the monitoring device 180 may be configured to monitor both sensor input and user input. For example, trigger conditions may be configured in the AM agent 190 for generating alarms, notification of alarms, defining acceptable responses to the notification of alarms, and defining acceptable actions performed to ensure protection of the IT asset. Depending on the value of the digital asset protected, the severity of action(s) performed as defined in the security policy may vary from simply notifying the mobile device 110 of the alarm condition to permanently erasing the digital asset information stored in the MCD 120 in response to receiving a cryptographic message.

Although customization of the policies, rules and conditions is available to the user, in many applications, a single NFC tap feature may be used to activate a default monitoring setting for basic monitoring of the IT asset.

At process 420, another NFC tap operation may be performed by the mobile device 110 to activate the monitoring and alarming function performed by the monitoring device 180. At process 430, the monitoring device 180, which is configured to operate in low power mode as well as in normal power mode, sends an alarm notification to the mobile device 110 via interface 134 using an IEEE 802.16 or IEEE 802.11 family of standards. In one implementation, the interface 134 may use an Internet Protocol (IP) network transport for communications. In one application, the notification of the alarm is sent as a SMS text on established, secure, and widely available 2G or 3G networks or as a message payload via an IP network. When the SMS text notification is received by the mobile device 110, the SmartRemon App 150 may be configured to verify the authenticity of the notification message and enable the user to respond appropriately depending on the policy, conditions, and feature set of the application.

At process 440, the user operating the mobile device 110 may send a SMS text response to perform one or more actions in accordance with the established policies, rules and conditions that constitute a breach in security. Commands or instructions sent as a SMS text message from the mobile device 110 to the MCD 120 may be checked for authorization based on credentials established during the local pairing between the two devices. In one application, a SMS text request is sent to the MCD 120 to locate itself (e.g., via a built-in GPS sensor) and report the location. In another application, a SMS text request is sent to the MCD 120 to disarm the monitoring device 180. In yet another application, a cryptographic SMS text message or a message that includes the same text message payload is sent (e.g., via 2G or 3G networks or via an IP network) to perform a lockout of MCD 120 to prevent unauthorized access. The text message or message payload sent to the MCD 120 to instruct it to lock down is authenticated. Encryption may be optionally used to prevent an attacker from reading the contents of the message. Authentication may be used to prevent an attacker from sending a malicious message that the recipient, e.g., the MCD 120, interprets as genuine. At process 450, location information may be sent by the monitoring device 180 to the mobile device 110.

Example Process

Figure 5:
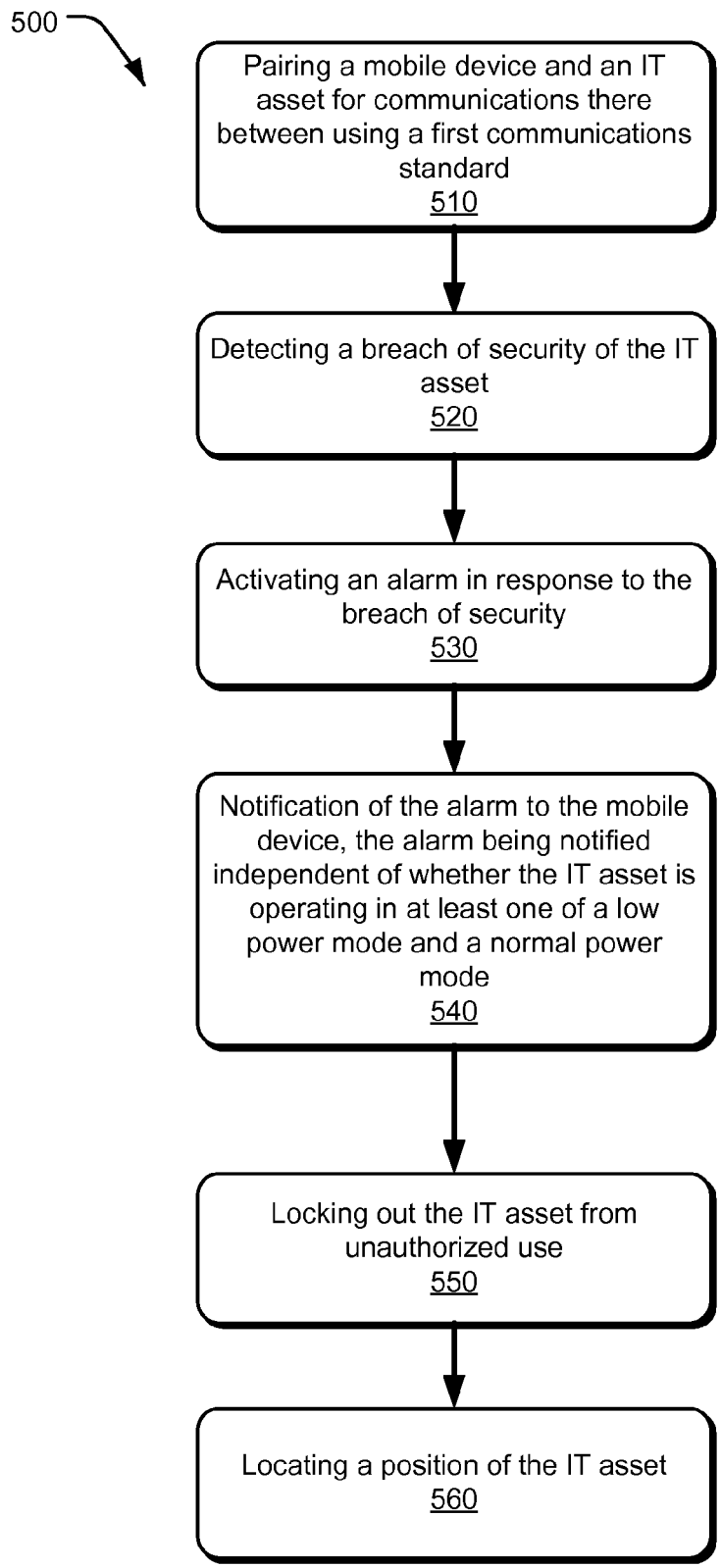
FIG. 5 a flow diagram illustrating a process to implement the techniques described herein for remotely monitoring digital assets.

FIG. 5 is a flow diagram illustrating a process 500 that implements the techniques described herein for remotely monitoring an IT asset. The process is illustrated as a collection of blocks in a logical flow graph, which represents a sequence of operations that may be implemented in hardware, software, or a combination thereof. In the context of software, the blocks represent computer instructions that, when executed by one or more processors of such a computer, perform the recited operations. Note that the order in which the process is described is not intended to be construed as a limitation, and any number of the described process blocks may be combined in any order to implement the process, or an alternate process. Additionally, individual blocks may be deleted from the process without departing from the spirit and scope of the subject matter described herein.

At process 510, the MCD 120 and the mobile device 110 are paired for remote monitoring using an NFC communication standard. At process 520, a breach of security of the IT asset, e.g., the MCD 120, is detected. At process 530, an alarm is activated in response to the breach of security. At process 540, a notification of the alarm is sent to the mobile device, the notification being independent of whether the IT asset is operating in at least one of a low power mode and a normal power mode. At process 550, a location of the IT asset is determined. At process 560, the IT asset is locked out to prevent unauthorized access.

The term "computer-readable media" includes computer-storage media. For example, computer-storage media may include, but are not limited to, magnetic storage devices (e.g., hard disk, floppy disk, and magnetic strips), optical disks (e.g., compact disk (CD) and digital versatile disk (DVD)), smart cards, flash memory devices (e.g., thumb drive, stick, key drive, and SD cards), and volatile and non-volatile memory (e.g., random access memory (RAM), read-only memory (ROM)).

Unless the context indicates otherwise, the term "logic" used herein includes hardware, software, firmware, circuitry, logic circuitry, integrated circuitry, other electronic components and/or a combination thereof that is suitable to perform the functions described for that logic.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A method that facilitates remote monitoring of an information technology (IT) asset, the method comprising:
    pairing the IT asset to a mobile device for wireless communications there between using a first interface that provides a first communications standard;
    detecting a breach of security of the IT asset itself;
    activating an alarm by the IT asset in response to the detected breach of security;
    notifying an existence of the alarm to the mobile device using a second interface that provides a second communication standard, which is different from the first communication standard, wherein the second communication standard is accessed directly by the IT asset in response to the detected breach of security; and
    locking out the IT asset from unauthorized use of the IT asset itself,
    the detecting, activating, and notifying occur regardless of which power mode that the IT asset is operating when detecting, activating, and notifying occur.

2. The method of claim 1 further comprising determining a location of the IT asset.

3. The method of claim 1, wherein the pairing is enabled by tapping the mobile device and the IT asset, the tapping being performed in accordance with a near field communications (NFC) standard.

4. The method of claim 1, wherein the second communication standard includes text messaging and the notification of the existence of the alarm is accomplished via one or more text messages.

5. The method of claim 1 further comprising determining a location of the IT asset based upon information obtained by the IT asset from a global positioning system (GPS).

6. At least one non-transitory computer-readable medium having stored thereon instructions that facilitates remote monitoring of a mobile computing device, the instructions being executable to cause a computer processor included in the mobile computing device to:
- pair a mobile device and the mobile computing device for communications there between using a first communications standard;
- detect a security breach of the mobile computing device itself;
- activate an alarm in response to a detected security breach of the mobile computing device;
- notify the mobile device of alarm using a second communications standard that is different from the first communications standard, wherein the mobile computing device is configured to access directly the second communications standard in response to detection of the security breach; and
- lockout the mobile computing device from unauthorized use of the mobile computing device itself,
- the detection, activation, and notification occurring regardless of which power mode that the IT asset is operating when detecting, activating, and notifying occur.

7. The at least one non-transitory computer-readable medium of claim 6, wherein the instructions being executable to further cause the computer processor to:
determine a location of the mobile computing device.

8. The at least one non-transitory computer-readable medium of claim 6, wherein the first communication standard is a near field communications (NFC) standard, wherein set up of the pair between the mobile device and the IT asset is enabled by tapping performed by in accordance with the NFC standard.

9. The at least one non-transitory computer-readable medium of claim 6, wherein the second communication standard includes text messaging and the notification of the existence of the alarm is accomplished via one or more text messages.

10. The at least one non-transitory computer-readable medium of claim 6, wherein the second communication standard includes IEEE 802.16 family of standards for cellular phones with WiMAX capability.

11. The at least non-transitory one computer-readable medium of claim 6, wherein the breach of security is selected from a group consisting of a loss in the communications using the first communications standard, detection of a motion of the mobile computing device itself, and detecting an input received from a user.

12. The at least one non-transitory computer-readable medium of claim 6, wherein the instructions being executable to further cause the computer processor to determine a location of the mobile computing device based upon information obtained by the mobile computing device from a global positioning system (GPS).

* * * * *